(12) United States Patent
Eder et al.

(10) Patent No.: US 8,138,110 B2
(45) Date of Patent: Mar. 20, 2012

(54) FIREPROOF CERAMIC MIX, FIREPROOF CERAMIC MOLDED BODY FORMED OF SAID MIX AND USE THEREOF

(75) Inventors: Johann Eder, Leoben (AT); Gerald Gelbmann, Leoben (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 115 days.

(21) Appl. No.: 12/744,325

(22) PCT Filed: Nov. 7, 2008

(86) PCT No.: PCT/EP2008/009423
§ 371 (c)(1),
(2), (4) Date: May 22, 2010

(87) PCT Pub. No.: WO2009/071162
PCT Pub. Date: Jun. 11, 2009

(65) Prior Publication Data
US 2010/0248933 A1    Sep. 30, 2010

(30) Foreign Application Priority Data

Dec. 6, 2007   (DE) .......................... 10 2007 058 665

(51) Int. Cl.
*C04B 35/20* (2006.01)
(52) U.S. Cl. ........................................ 501/122
(58) Field of Classification Search .................. 501/122
See application file for complete search history.

(56) References Cited

U.S. PATENT DOCUMENTS

| | | | |
|---|---|---|---|
| 2,026,088 A | 12/1935 | Harvey et al. | |
| 2,418,026 A | 3/1947 | Goldschmidt | |
| 5,374,593 A * | 12/1994 | Huard et al. | 501/122 |
| 5,453,408 A * | 9/1995 | Huard et al. | 501/122 |
| 8,030,236 B2 * | 10/2011 | Klischat et al. | 501/122 |
| 2009/0227442 A1 | 9/2009 | Klischat et al. | |

FOREIGN PATENT DOCUMENTS

| | | | |
|---|---|---|---|
| DE | 582893 | | 8/1933 |
| DE | 700416 | | 12/1940 |
| DE | 2308171 | | 9/1974 |
| DE | 3720460 | | 12/1988 |
| DE | 102006007781 | A1 | 8/2007 |
| FR | 2218305 | | 9/1974 |
| GB | 487213 | | 6/1938 |
| GB | 1094906 | | 12/1967 |
| GB | 2206110 | | 12/1988 |
| JP | 06128023 | * | 5/1994 |

OTHER PUBLICATIONS

Othman, et al.; "Sintering of magnesia refractories through the formation of periclase—forsterite—spinel phases"; Ceramics International; 2005; pp. 1117-1121; vol. 31; No. 8; Elsevier Ltd; Amsterdam, NL.
Petric, et al.; "Thermodynamic analysis of results obtained by examination of the forsterite and spinel formation reactions in the process of magnesium oxide sintering"; Industrial & Engineering Chemistry Research; 1989; pp. 298-302; vol. 28; No. 3; American Chemical Society, US.
Kolterman; "Olivine as a refractory material in the steel industry"; Taikabutsu Overseas; 1988; pp. 3-8; vol. 8; No. 1;Hoesch Stahl AG; Tokyo, JP.
Ralston, et al.; "Electrically fused Forsterite-Olivine, I-II"; Journal of the American Ceramic Society; 1943; pp. 405-408; vol. 26; No. 12; Blackwelll Publishing; Malden, MA, US.
Koltermann; "Pocket Manual Refractory Materials"; Vulkan Verlag Essen; 1997; pp. 178-180; Essen; DE.
ROMPP Online, Version 3.1; "Olivin"; 2008.

* cited by examiner

*Primary Examiner* — Karl Group
(74) *Attorney, Agent, or Firm* — Christopher L. Parmelee; Walker & Jocke

(57) ABSTRACT

The invention relates to a refractory ceramic batch made of 30 to 95% by mass of a synthetically manufactured fine component selected from the group consisting of: fused forsterite, sintered forsterite, each in a grain size <1 mm, further 5 to 70% by mass of at least one coarse component selected from the group consisting of: sintered magnesia, fused magnesia, each in a grain size >1 mm, up to 5% by mass of a sintering aid and not more than 5% by mass of at least one other component, wherein the components sum up to 100% by mass. The invention further comprises a workpieces made of this batch and the use of said workpiece as a checker brick.

9 Claims, 1 Drawing Sheet

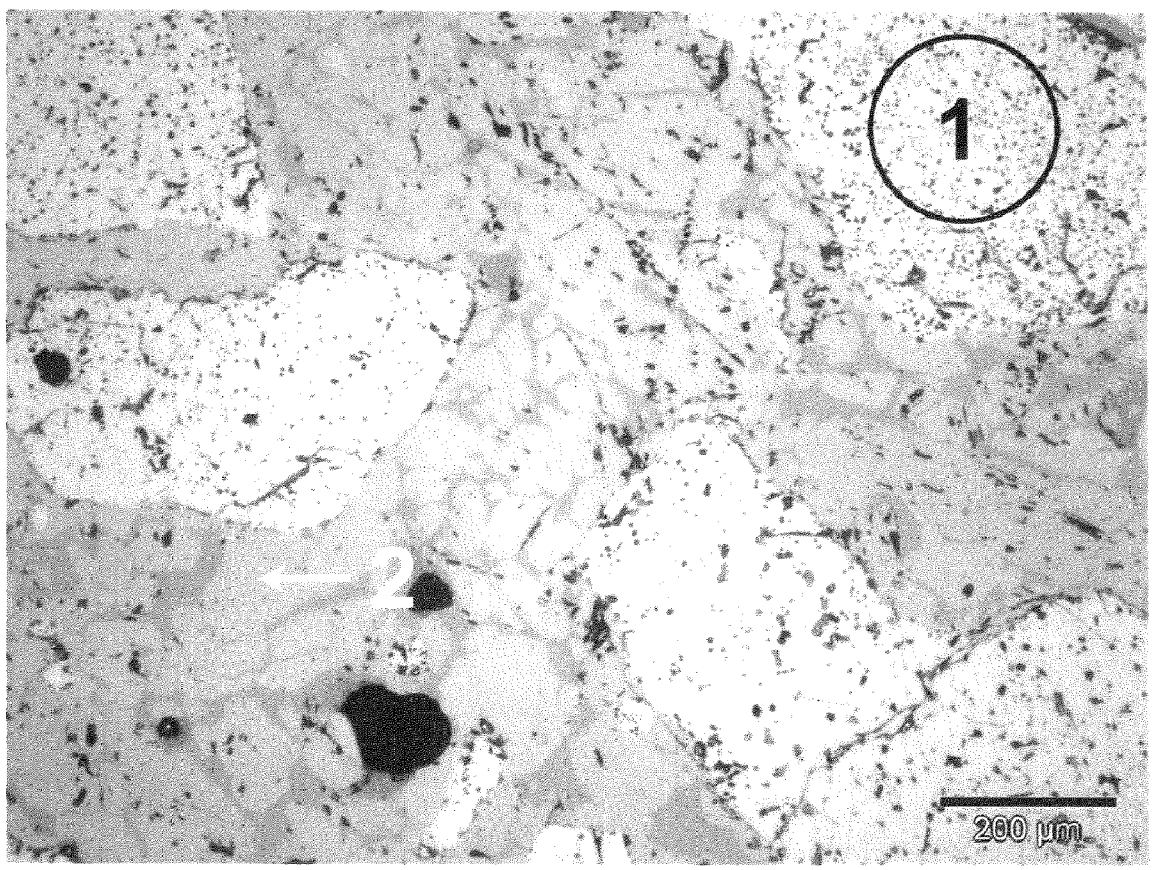

FIREPROOF CERAMIC MIX, FIREPROOF CERAMIC MOLDED BODY FORMED OF SAID MIX AND USE THEREOF

DESCRIPTION

The invention concerns a fireproof (refractory) ceramic mix (batch), a fireproof (refractory) ceramic molded body (workpiece) formed of that mix and the use of the molded body.

From DE 3720460 C2 a procedure for manufacturing a fired refractory magnesia brick with forsteritic matrix is known, which brick comprises 15 to 30% by weight of zircon mineral ($ZrSiO_4$). These bricks have largely proven their worth. They are used for example in form of so called checker bricks (hollow cylindrical brick) in regenerated checker works of glass melting furnaces. Their corrosion resistance as well as the resistance at a change of temperature and thermoshock, particularly in a longterm application of the bricks (>10 years) is improvable. Furthermore the zircon mineral is expansive.

From DE 2308171 A bricks for the lining of glass melting tubs are known, that are manufactured from olivine and sintered MgO and from olivine and $MgOAl_2O_3$ (MA) fused spinel respectively. These bricks show sufficient corrosion resistance under ordinary operating conditions, but fail at peak temperatures from>1200° C. and are therefore insufficient for an application in regenerated checker works of glass melting furnaces.

DE 102006007781 A1 describes a refractory batch (mix) with an alkaline main component based on MgO or MgO/CaO, where the term main component is defined as the batch (mix) containing over 60% by weight of the main component. The remaining batch components consist of a forsterite material or a mixture that forms forsterite. From this batch (mix) refractory bricks are obtained after firing, that can be used for example in rotary kilns for cement manufacture or in lime shaft kilns. It is emphasized that these bricks show a good resistance against siliceous melting phases, which originate from the material being fired and showing durable crust formation on the refractory lining, particularly in parts of rotary kilns.

The object of the invention is to offer a batch for manufacturing of a ceramic workpiece, that is refractory when used, which may be installed preferably in the upper or middle checker work section of a regenerated checker work of a glass melting furnace as well as in the section of the impact wall (baffle plate) in the entry section of the checker work and is characterised by a good thermal conductivity, heat storage capacity and corrosion resistance.

BRIEF DESCRIPTION OF THE DRAWING

The FIGURE shows a microsection of a workpiece according to the invention.

DETAILED DESCRIPTION

The batch which meets these requirements consists according to the invention of:
  30 to 95% by weight of a synthetically manufactured fine component of fused forsterite with a grain size<1 mm,
  5 to 70% by weight of at least one coarse component of the group: sintered MgO, fused magnesia, with a grain size>1 mm,
  up to 5% by weight of a sintering aid,
  not more than 5% by weight of at least one other component.

The outstanding corrosion resistance of bricks which are manufactured from this batch are particularly caused by the fused forsterite as fine component. The fraction of fused forsterite can therefore be well over the lower limit of 30% by weight based on the entire batch, for example with a lower limit of 40, 55, 65, 75 or 85% by weight. Accordingly the fraction of particularly the coarse component reduces, so that all batch components sum up to 100% by weight.

According to one embodiment the fraction of the fine component (fused forsterite) amounts to between 32 and 45% by weight, the coarse component between 55 and 68% by weight.

Bricks that are manufactured from a batch, where the mass fraction of fine component is bigger than the mass fraction of coarse component, show a particularly good corrosion resistance. In that respect the ratio of fine component/coarse component can for example amount 80/20, 85/15, 90/10 or 95/5. Here the fraction of sintering aid and eventual other components were not taken into account. Their fraction reduces the mass fraction of the fine and coarse components respectively.

The fused forsterite of the fine component can entirely or partly be replaced by sintered forsterite.

As other component for example sintered forsterite can be applied.

The synthesised forsterite component(s) has (have) the essential advantage to be mostly free of iron oxide (FeO/$Fe_2O_3$). Another advantage, for example compared to forsterite formed in situ, is that a higher mass fraction in the workpiece can be obtained, because the formation of forsterite in situ is accompanied by an volume increase. This distinguishes the synthetically manufactured fine component from natural olivine (same composition), which always has a fraction FeO/$Fe_2O_3$ of at least 3% by weight based on the corresponding component. The fraction of iron oxide (ferrous and ferric oxide) is sometimes largely greater. Fractions of iron oxide (ferrous and ferric oxide) worsen the creep in compression (according to DIN EN 993-9). Therefore according to one embodiment the batch should have a fraction of not more than 1.0% by weight of FeO+$Fe_2O_3$, preferably<0.5% by weight, at best 0% by weight. The phase diagram of $Mg_2SiO_4$-$Fe_2SiO_4$ confirms the higher refractoriness of magnesia-silicates with low iron oxide (ferrous and ferric oxide) content.

Further optimisations concerning corrosion behavior arise from restricting the CaO content to <2% by weight. This requires applying more or less pure MgO material as coarse component.

Furthermore the content of $ZrO_2$/$ZrSiO_4$ should be as low as possible, preferably<0.5% by weight based on the entire batch. Batches and workpieces which contain no $ZrO_2$/$ZrSiO_4$ are preferred. By not using $ZrO_2$/$ZrSiO_4$ the workpiece can be fired more easily from the batch and the corrosion resistance at reducing conditions and alkaline attack will improve.

The fine component can be present in a grain size of<0.7 mm, but can also be significantly finer, for example <100 µm.

The coarse component has typically a grain size of up to 5 or up to 8 mm.

As sintering aid for example a clay suspension (slurry) is suited.

From the batch which has a total share of FeO, $Fe_2O_3$, $ZrO_2$, $ZrSiO_4$ of<0.5% by weight in one embodiment, a refractory ceramic workpiece can be manufactured by forming and subsequent firing at temperatures over 1500° C., where the coarse component is embedded insular in the forsterite matrix.

For workpieces according to the invention following exemplary values for the refractoriness under load (DE) according to DIN-EN 993-8 and creep in compression (DF) according to DIN EN 993-9 were determined:

DE: $T_0=1590°$ C.

$T_{05}=1660°$ C.

DF: Height change of the sample of +/−0.1 and +/−0.2 linear-% for 5-25 h at a temperature of 1500° C. with a heat rate of 5K/minute and a superimposed load of 0.2 MPa. A microsection of the workpiece according to the invention is illustrated in the FIG. (1) indicates MgO grains which are embedded insular in the forsterite matrix (2).

Workpieces according to the invention have a good corrosion resistance towards sulfates as well as towards alkaline species in the exhaust gas, which in particular occur in the middle section of the regenerated checker work of a glass melting furnace (also called condensation zone). The declaration "middle section" refers to a view in vertical direction, which means the checker work has a section above this middle section and a section below this middle section. The exhaust gas which can contain solids like $SiO_2$ and/or CaO, is guided from an associated glass tub, across the upper checker work section through the middle section into the lower section of the checker work. The temperatures in the upper section of the checker work are particularly high and can reach up to 1500° C. In the middle section of the chamber the temperature load (thermal stress) caused by the exhaust gas is still at about 1000° C., while the temperature in the chamber at the lower section of the checker work is 800° C. and below.

The workpieces show a high corrosion resistance also towards $SiO_2$ dust which reaches the hot section of the impact wall (baffle plate) and the upper section of the checker work of a regenerated checker work of a glass melting furnace from the section of a glass tub.

The coarse component includes magnesia in form of fused or sintered magnesia, with typical MgO contents from 85 to 99% by mass, preferably over 95% by mass.

For the manufacturing of the batch component magnesia and silica sand (quartz sand) can be used (besides the sintering aid and any other minor ingredients).

In the following some raw material blends (batches) are listed exemplary:

EXAMPLE

|  | 1 | 2 | 3 | 4 | 5 |
|---|---|---|---|---|---|
| fused forsterite <0.7 mm | 35 | 55 | 70 | 65 | 95 |
| sintered forsterite <1.0 mm |  | 1 | 5 |  |  |
| sintered magnesia (1-5 mm) | 64 |  | 11 | 34 |  |
| fused magnesia (1-6 mm) |  | 42 | 11 |  | 3 |
| sintering aid (<0.05 mm) | 1 | 2 | 3 | 1 | 2 |

The invention claimed is:

1. Refractory ceramic batch made of:
   a) 30 to 95% by mass of a synthetically manufactured fine component selected from the group consisting of: fused forsterite and sintered forsterite, each in a grain size <1mm,
   b) 5 to 70% by mass of at least one coarse component selected from the group consisting of: sintered magnesia and fused magnesia, each in a grain size >1 mm,
   c) up to 5% by mass of a sintering aid,
   d) not more than 5% by mass of at least one other component
   wherein the components a) to d) sum up to 100% by mass.

2. Batch according to claim 1 with a fraction of the fine component between 32 and 50% by mass.

3. Batch according to claim 1 with a fraction of the coarse component between 50 and 68% by mass.

4. Batch according to claim 1 in which a mass fraction of fine component is bigger than a mass fraction of coarse component.

5. Batch according to claim 1 wherein $FeO + Fe_2O_3$ amount to <1% by mass.

6. Batch according to claim 1 wherein CaO amounts to <2% by mass.

7. Batch according to claim 1 wherein $ZrO_2/ZrSiO_4$ amounts to <0.5% by mass.

8. Batch according to claim 1 wherein FeO, $Fe_2O_3$, $ZrO_2$, and $ZrSiO_4$ in total amounts to <0.5% by mass.

9. Refractory ceramic workpiece manufactured from a batch according to claim 1 by forming and subsequent firing at temperatures over 1500° C., where the coarse component is embedded insular in a forsterite matrix.

* * * * *